US008774275B2

(12) United States Patent
Nilsson

(10) Patent No.: US 8,774,275 B2
(45) Date of Patent: Jul. 8, 2014

(54) VIDEO CODING

(75) Inventor: Michael E Nilsson, Ipswich (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 309 days.

(21) Appl. No.: 12/741,922

(22) PCT Filed: Oct. 29, 2008

(86) PCT No.: PCT/GB2008/003691
§ 371 (c)(1),
(2), (4) Date: May 7, 2010

(87) PCT Pub. No.: WO2009/060178
PCT Pub. Date: May 14, 2009

(65) Prior Publication Data
US 2010/0246677 A1 Sep. 30, 2010

(30) Foreign Application Priority Data

Nov. 7, 2007 (EP) .................................. 07254407

(51) Int. Cl.
H04N 7/12 (2006.01)
H04N 7/50 (2006.01)
(52) U.S. Cl.
CPC ..................................... H04N 7/50 (2013.01)
USPC .................................................. 375/240.14
(58) Field of Classification Search
CPC ....................................................... H04N 7/50
See application file for complete search history.

(56) References Cited

U.S. PATENT DOCUMENTS 5,978,029 A 11/1999 Boice et al.
7,003,171 B1 2/2006 Takeo
(Continued)

FOREIGN PATENT DOCUMENTS

JP 3-124143 5/1991
JP 6-261302 9/1994
(Continued)

OTHER PUBLICATIONS

International Search Report for PCT/GB2008/003691, mailed Jan. 26, 2009.
(Continued)

Primary Examiner — Sath V Perungavoor
Assistant Examiner — Kate Luo
(74) Attorney, Agent, or Firm — Nixon & Vanderhye P.C.

(57) ABSTRACT

A sequence to be encoded is divided into a plurality of temporal portions or chunks. The sequence is then analyzed to determine for each chunk, in accordance with a plurality of encoding quality settings, data establishing the relationship between the quality settings and (i) a quality metric for the portion and (ii) the number of bits generated by encoding the portion at that quality setting. Given a target quality, a target bit rate is then set (or vice versa); then one chooses a set of quality settings, one per chunk, that tends to minimize a combined quality cost for the sequence within the constraint that transmission of encoded video at the target bit rate via transmitting and receiving buffers of specified size and initial receiver buffer fullness shall not cause underflow nor overflow. The combined quality cost is the sum of individual quality costs each of which is a function of the deviation of the quality metric of the respective encoded portion from the target quality, the function being such that the cost generally increases as the absolute value of the deviation increases. The sequence is then encoded using the chosen quality settings.

16 Claims, 6 Drawing Sheets

(56) References Cited

U.S. PATENT DOCUMENTS

| | | | |
|---|---|---|---|
| 2003/0043906 A1* | 3/2003 | Bailleul | 375/240.06 |
| 2003/0202582 A1* | 10/2003 | Satoh | 375/240.03 |
| 2004/0028139 A1 | 2/2004 | Zaccarin et al. | |
| 2007/0204067 A1* | 8/2007 | Walker et al. | 709/247 |
| 2007/0217758 A1* | 9/2007 | Yahata et al. | 386/52 |
| 2008/0232466 A1 | 9/2008 | Faerber et al. | |

FOREIGN PATENT DOCUMENTS

| | | |
|---|---|---|
| WO | 99/53623 | 10/1999 |
| WO | 2006/078594 | 7/2006 |
| WO | 2007/028515 | 3/2007 |
| WO | 2007/090178 | 8/2007 |

OTHER PUBLICATIONS

Ortega et al. "Optimal Trellis-Based Buffered Compression and Fast Approximations", IEEE Transactions on Image Processing, IEEE Service Center, Piscataway, NJ, US, vol. 3, No. 1, Jan. 1, 1994, pp. 26-39, XP000433559.

Office Action (7 pgs.) dated Jul. 26, 2012 issued in corresponding European Application No. 08 846 915.0.

Office Action (4 pgs.) dated Oct. 16, 2012 issued in corresponding Japanese Application No. 2010-532651 with an at least partial English-language translation thereof (3 pgs.).

Lin, Fu-Huei et al., "A Constant Subjective Quality MPEG Encoder", School of Electrical & Computer Engineering, Georgia Institute of Technology, Atlanta, GA, XP-010151769 1995 IEEE (4 pgs.).

Office Action (4 pgs.) mailed Dec. 10, 2013 in corresponding Japanese Application No. 2010-532651 with an at least partial English-language translation thereof (4 pgs.).

Chi-Yuan Hsu et al., "Joint Selection of Source and Channel Rate for VBR Video Transmission Under ATM Policing Constraints", IEEE Journal on Selected Areas in Communications, vol. 15, No. 6, Aug. 1997 (13 pgs.).

* cited by examiner

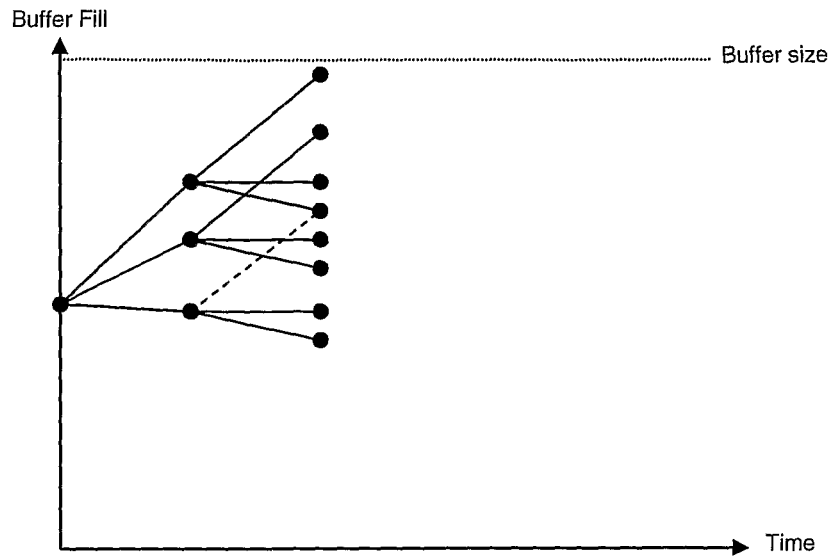
Figure 3. The trellis used by the Viterbi algorithm to find the optimal bit allocation.
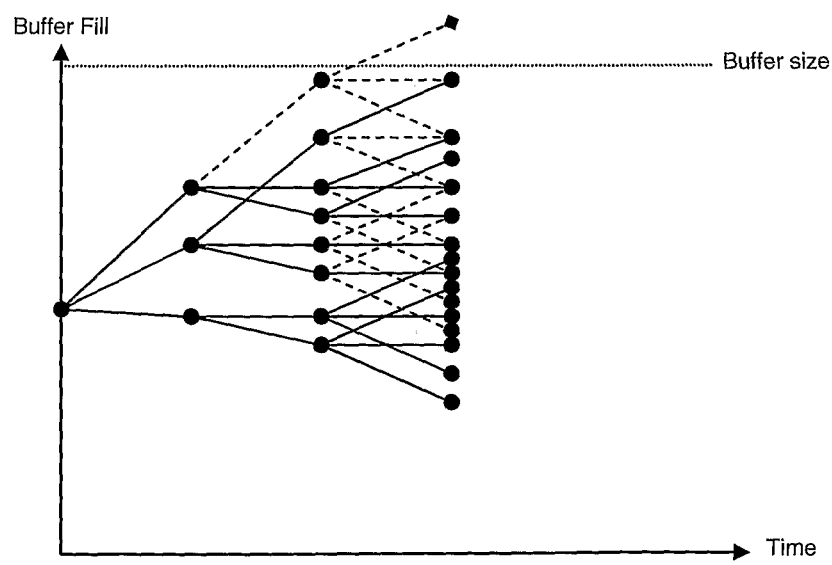
Figure 4. The trellis used by the Viterbi algorithm to find the optimal bit allocation.

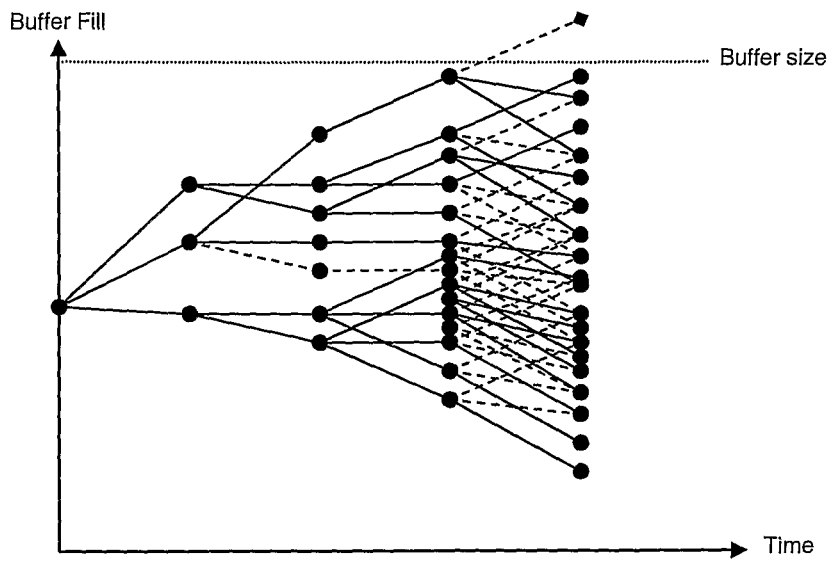
Figure 5. The trellis used by the Viterbi algorithm to find the optimal bit allocation.
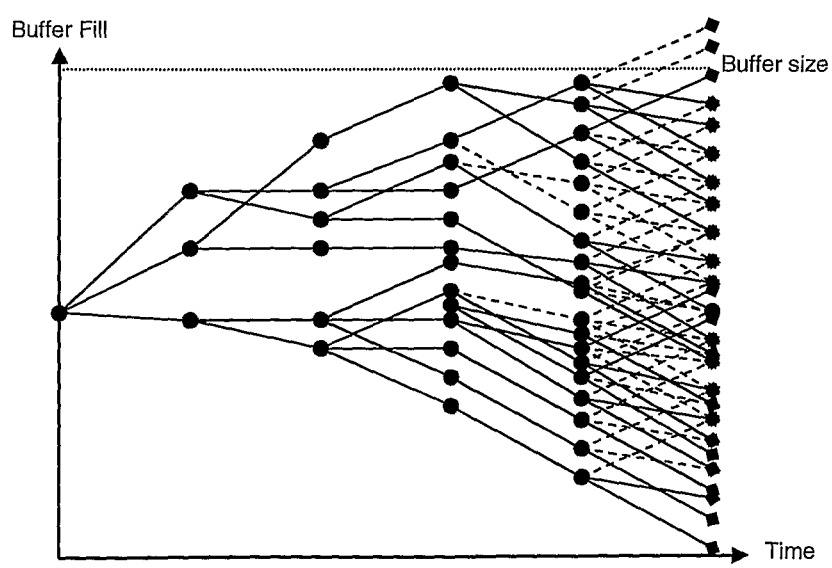
Figure 6. The trellis used by the Viterbi algorithm to find the optimal bit allocation.

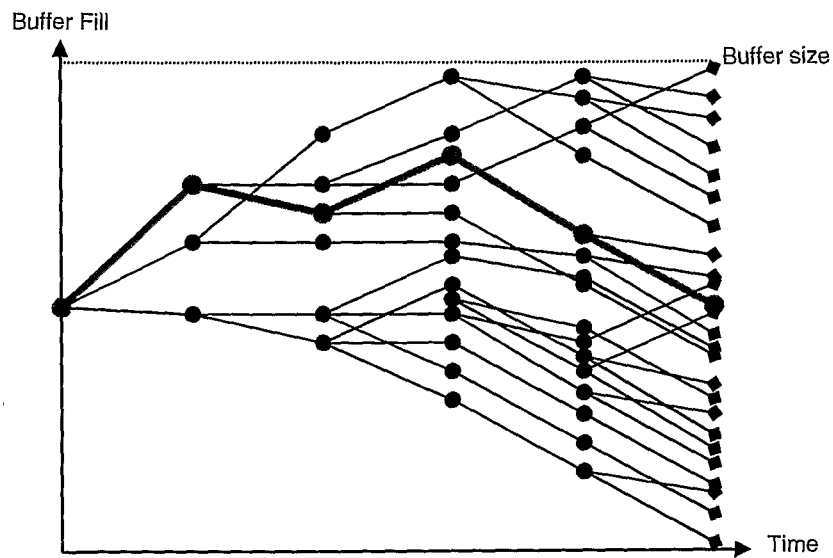
Figure 7. The trellis used by the Viterbi algorithm to find the optimal bit allocation.
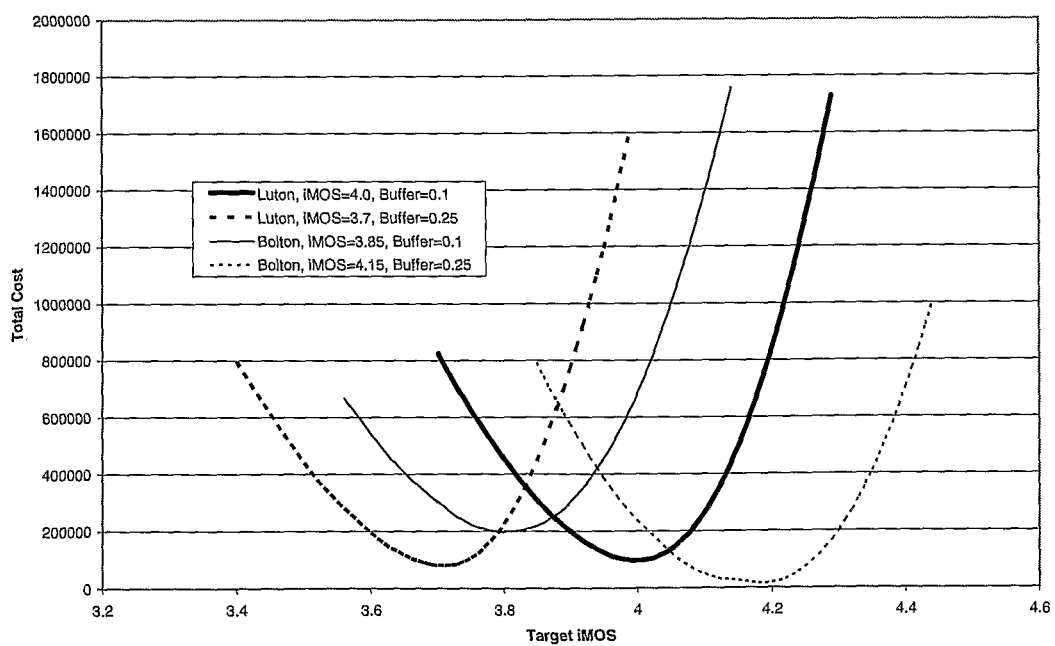
Figure 8. Total optimal cost vs. target iMOS for some combinations of target bit rate and buffer size.

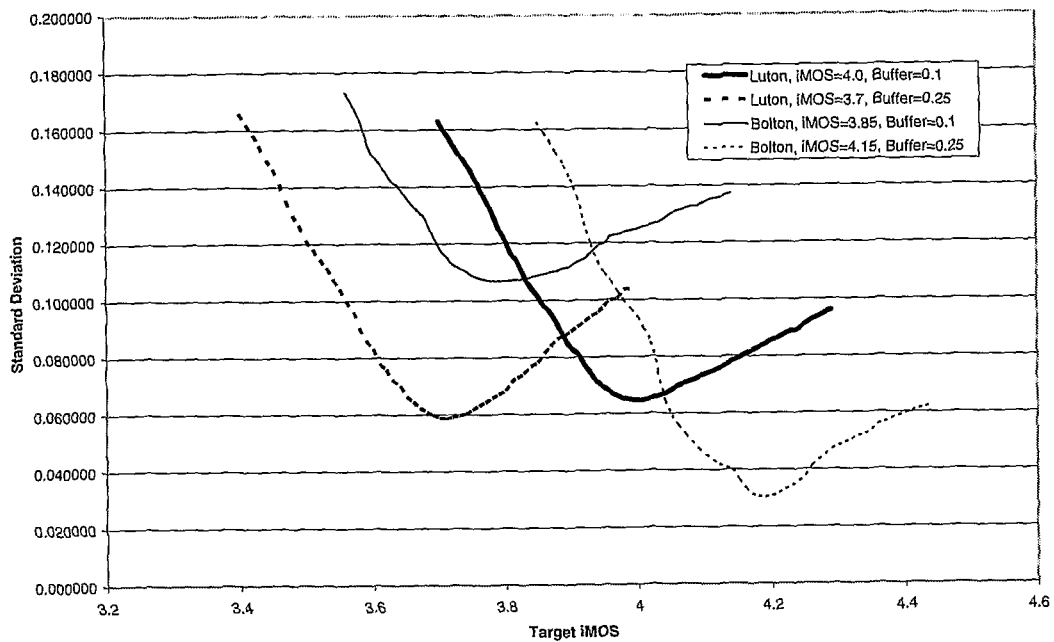
Figure 9. Optimal standard deviation vs. target iMOS for some combinations of target bit rate and buffer size.
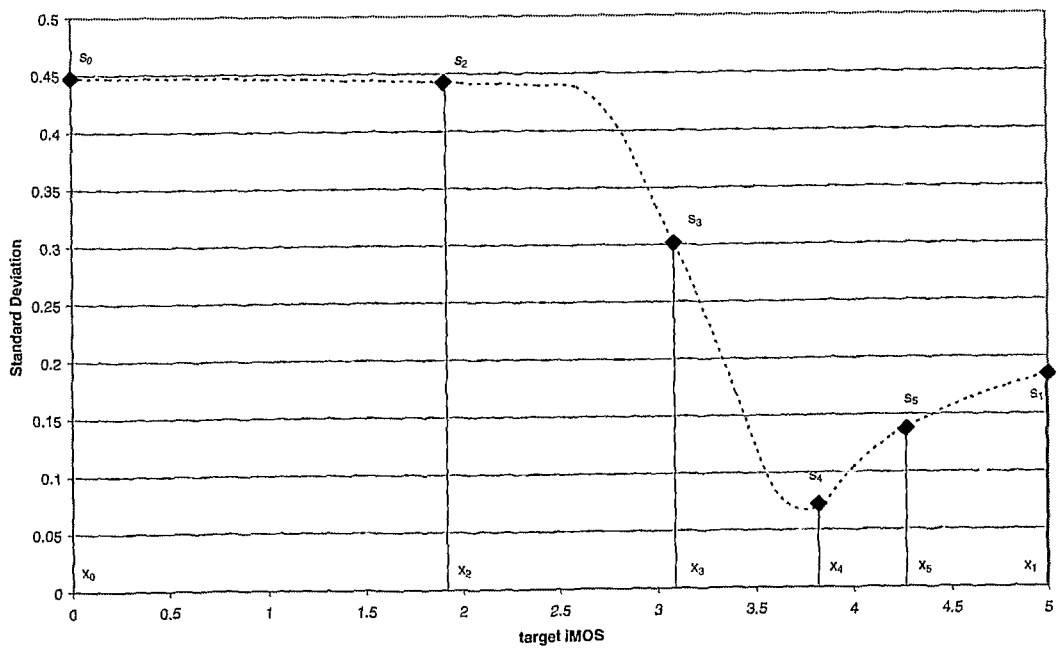
Figure 10. Illustration of the Golden Section Search method

VIDEO CODING

This application is the U.S. national phase of International Application No. PCT/GB2008/003691 filed 29 Oct. 2008, which designated the U.S. and claims priority to European Application No. 07254407.5, filed 7 Nov. 2007, the entire contents of each of which are hereby incorporated by reference.

BACKGROUND AND SUMMARY

The present invention is concerned with video coding.

According to the present invention there is provided a method of video coding comprising
   a) dividing a sequence to be encoded into a plurality of temporal portions;
   b) analysing the sequence to determine for each portion, in accordance with a plurality of encoding quality settings, data establishing the relationship between the quality settings and (i) a quality metric for the portion and (ii) the number of bits generated by encoding the portion at that quality setting;
   c) analysing the data along with a target quality and target bit rate to choose a set of quality settings, one per portion, that tends to minimise a combined quality cost for the sequence within the constraint that transmission of encoded video at the target bit rate via transmitting and receiving buffers of specified size and initial receiver buffer fullness shall not cause underflow nor overflow; wherein the combined quality cost is the sum of individual quality costs each of which is a function of the amount of deviation of the quality metric of the respective encoded portion from the target quality, the function being such that the cost generally increases as the absolute value of the deviation increases; and
encoding the sequence using the chosen quality settings.

Other aspects of the invention are defined in the claims

BRIEF DESCRIPTION OF THE DRAWINGS

Some embodiments of the invention will now be described with reference to the accompanying drawings, in which:
FIGS. 3 to 7 are trellis diagrams explaining the operation of the Viterbi decoding;
and
   FIGS. 8, 9 and 10 are graphs showing the interrelationships between certain coder parameters.

DETAILED DESCRIPTION OF PRESENT EXAMPLE EMBODIMENTS

Figure 1:
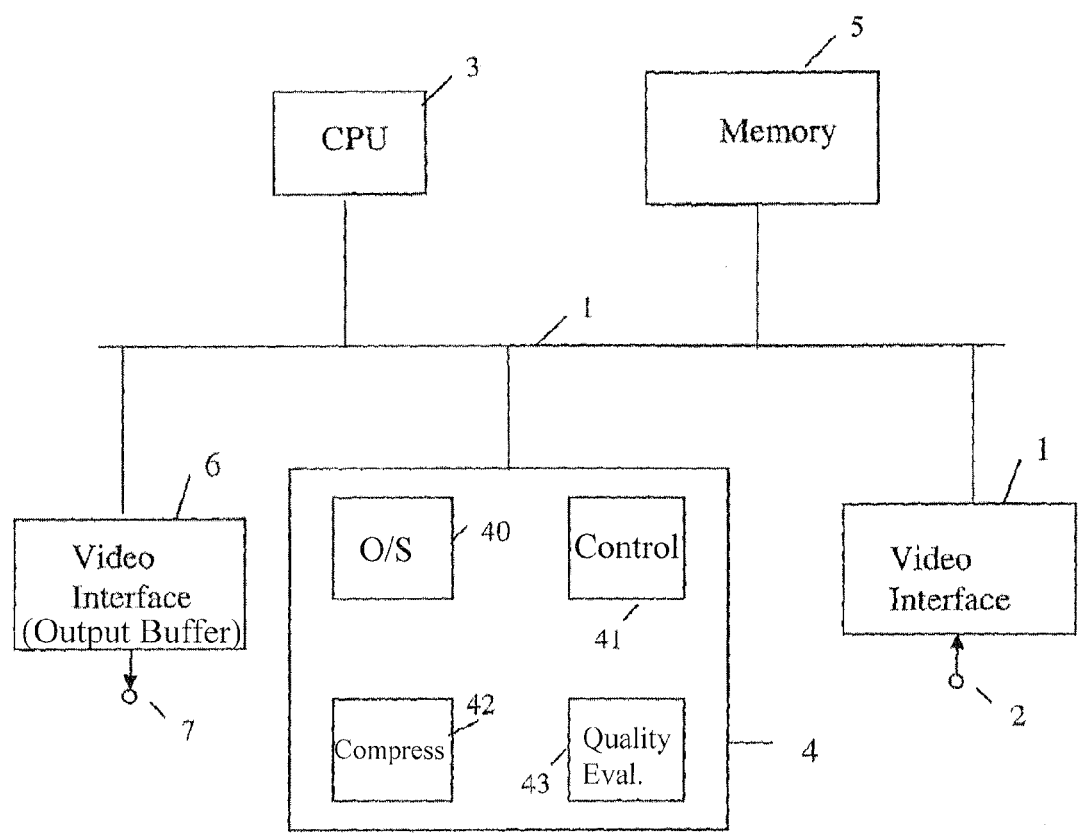
FIG. 1 is a block diagram of a video coder.

The apparatus shown in FIG. 1 comprises a video interface 1 that receives digitally coded video signals, in uncompressed form, at a video input 2. A processor 3 operates under control of programs stored in disc storage 4 and has access to memory 5 and a video output buffer 6 that feeds a video output 7. The programs include a general purpose operating system 40 and video coding software which implements one of more of the coding methods shortly to be described. This software comprises several programs (or groups of programs), namely
   control software 41;
   compression software 42;
   perceptual quality evaluation software 43.

Figure 2:
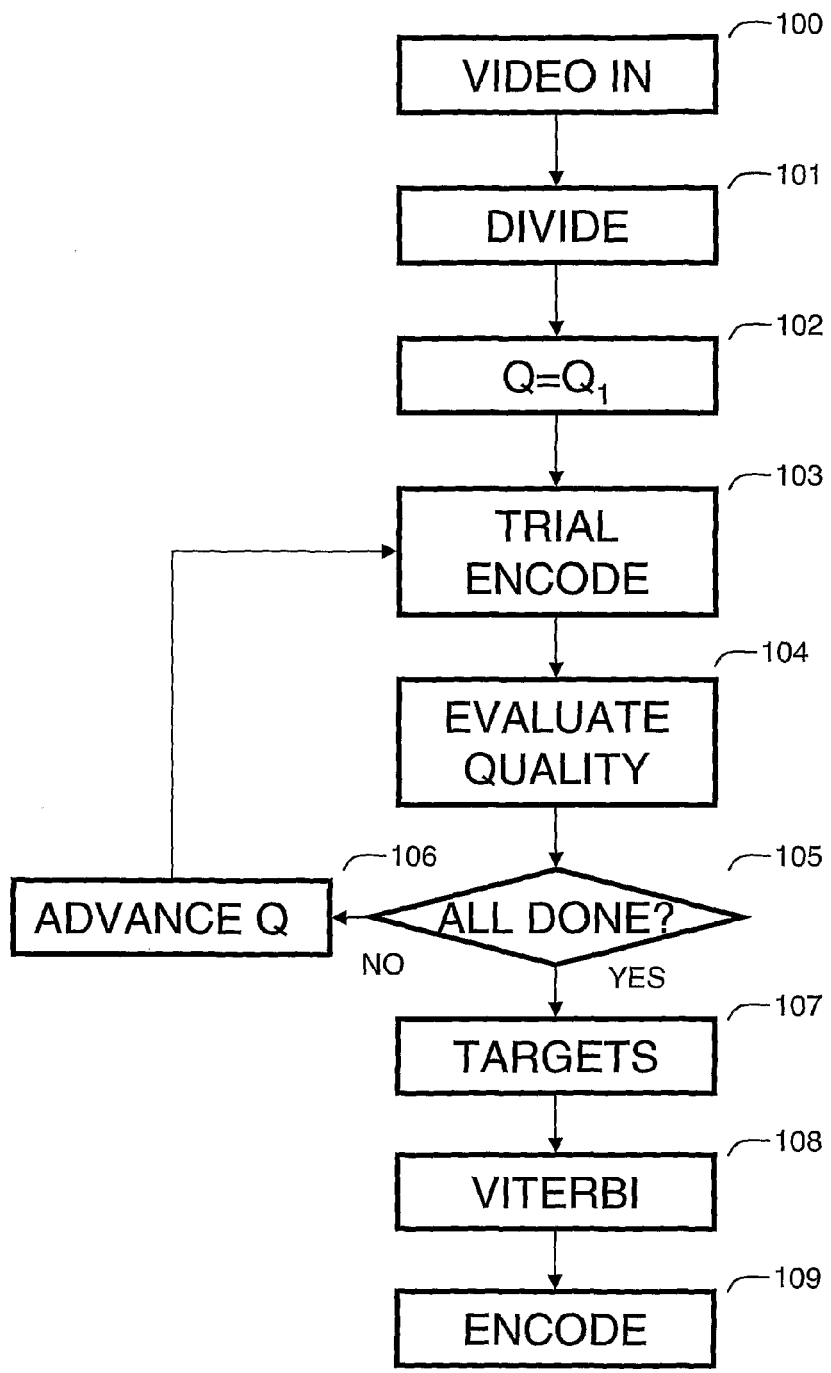
FIG. 2 is a flowchart explaining the operation of the coder of 1.

We will now describe a video coding method according to a first version of the invention, with reference to the flowchart of FIG. 2. In this version we suppose that encoded video will be stored in the buffer 6 and read out from the buffer to the output 7 at a constant bit rate b. At the corresponding decoder (not shown, as it is conventional) there will be a decoder buffer that receives the encoded video at this same constant rate and from which the decoder will read data as and when required. In this description, "buffer size" means the maximum number of bits that the buffer can contain and "buffer content" or "buffer fullness" means the number of bits actually stored in the buffer at any given time Unless otherwise stated, references in this description to buffer fullness refer to the decoder buffer; note however that the decoder buffer fullness and coder buffer fullness are related, so that any criterion that is expressed in terms of the one can also be expressed in terms of the other.

At step 100, a sequence of digitally coded video frames are received at the input 1 and stored on the disc 4. In this version we assume that the whole sequence is captured before processing commences, though this is not actually essential. At step 101, the sequence is divided into N chunks or portions, each consisting of one or more frames. Constraints on the choice of chunk length and the timing of inter-chunk boundaries will be discussed later. Next, a trial coding process takes place, at each of a plurality of quantiser step sizes $Q_k$ (k=1 ... K), using a suitable video coding algorithm having a variable quantiser step size. In this version, encoding is performed in accordance with the ITU-T recommendation H.264.

At step 102, the step size is set to a first trial value $Q_1$, and at step 103 the sequence is encoded using the compression software 72 set to apply this one step size. The number of bits used to encode each chunk is recorded in the memory 5, b(i) being the number of bits used to encode chunk i. At step 104, each chunk is then evaluated using the perceptual quality evaluation software 73, to produce a quality measure in the form of an instantaneous mean opinion score iMOS(i) (in the range 0 to 5) for the relevant chunk. These scores are likewise stored in the memory 5. As shown, the quality evaluation follows the coding but in practice one would prefer to evaluate each encoded chunk as it becomes available, in parallel with the trial encoding of later chunks. At 105 a check is performed as to whether the trial encoding has been performed for all K step sizes of the set. If not, the step size is set at 106 to the next value in the set and the process is repeated from step 103.

Once all K trials have been performed, the task remains of deciding which step size to use for encoding each chunk. The aim is one of constant quality, subject to the proviso that the buffers shall not be permitted to overflow or underflow. Buffer preload is to be permitted—i.e. there is a delay $t_0$ between the first bits arriving at the decoder and the decoder starting to decode, at which instant the receiver buffer fullness is $bt_0$ bits.

We prefer, with a view to maintaining the quality reasonably constant, to define a target quality $iMOS_T$, and endeavour to minimise deviations of quality from this target. It may be that the bit rate b is to be specified, or a specific target quality $iMOS_T$ is required; because these variables are interdependent, the next step (step 107 in the flowchart) is, whichever of these variables is specified, to determine the value of the other one. Details of this step will be given later.

The next step (108) uses a Viterbi algorithm to choose for each chunk a quantiser step size such that, subject to the overriding requirement of avoiding buffer overflow and underflow, the resulting set of step sizes meets the criterion of minimising—or nearly minimising—an overall cost measure indicative of the degree to which quality deviates from the target. Here we choose the sum of the squares of the deviations from target, that is:

$$SquareCost = \sum_{i=1}^{N} (iMOS(i) - iMOS_T)^2 \quad (1)$$

The algorithm may be visualised as building a trellis. From a starting node there are paths leading to a node for each of the encodings of the first chunk, and from each of these nodes we add a path for each of the encodings of the second chunk, and so on. Each node on each path has an associated state and total cost. The state value is the decoder buffer fullness, suitably quantised to give a practical number of possible states. The total cost is an accumulated measure of the consistency of quality of the encoding.

When two or more paths converge to a single state, we invoke Bellman's Optimality Principle which states that a sub-path is optimal if it is part of a path that is optimal, provided that the cost is independent and additive with respect to each branch. This equates to stating that when two or more of our paths converge, only the path that has the lowest total cost could possibly be on the overall optimal path. We then apply the Viterbi algorithm and prune the sub-optimal paths from the trellis. We also prune any paths that reach states that correspond to either buffer overflow or underflow.

We can choose the initial state, or buffer level, arbitrarily, although this does directly correspond to the start-up delay. A good starting point is 50% fullness, though tests indicate that initial fullnesses lower than this can be used without greatly affecting the level or consistency of quality.

At the first node, the buffer fullness is the initial state, $bt_0$. During the following time period $t_c$, corresponding to the playing duration of a chunk, two things happen: further data arrive, $bt_c$ bits, and $b_1$ bits are removed from the buffer for decoding of the first chunk. Thus, after J chunk periods, the fullness of the decoder buffer is $$F = bt_0 + Jbt_c - \sum_{j=1}^{J} b_j$$

where of course the values for $b_j$ are those corresponding to the quantiser step sizes for the particular trellis path.

In order to satisfy the constraint that the total number of encoded bits, i.e. $\Sigma b_j$, equals the total number of bits entering the buffer, i.e. $bt_c$ times the number of chunks in the sequence, the final state should (but see later discussion) correspond to zero buffer fullness or, if the buffer is assumed to continue to be filled with dummy data at rate b after the last chunk, be equal to the initial state. All paths that lead to other final states can then be pruned, leaving just one path through the trellis: the optimal path given the initial state and the buffer size constraint.

FIG. 3 shows a trellis where each chunk has been encoded with only three quantisation indices, and two chunks have been added to the trellis. Two paths converge at one of the nodes on the third column of nodes. The path with the higher cost to this point can be pruned, and is shown as a dotted line. FIG. 4 shows the result of adding the encodings of one more chunk to the trellis. On the right-most column of nodes, a number of paths converge to various nodes. Again those that have the higher cost to this point can be pruned and are shown with dotted lines. One path exceeds the buffer size, and would therefore lead to overflow, and can be pruned. The result of this is one node in the third column having no child nodes, thus indicating the path into it can be pruned. FIG. 5 shows the result of pruning the dotted paths of FIG. 4, and the addition of the encodings of the fourth chunk of video. Again paths to be pruned are marked with dotted lines. FIG. 6 shows the result of pruning the dotted paths of FIG. 5, and the addition of the encodings of the fifth chunk of video. Again paths to be pruned are marked with dotted lines. FIG. 7 shows the result of pruning the dotted paths of FIG. 6, and, as in this example there are only five chunks to encode, all paths that do not lead to the initial state (initial buffer fullness) can be pruned as they correspond to encodings that do not meet the bit rate constraint. This just leaves the optimal path through the trellis, shown as the highlighted path, corresponding to the optimum encoding.

Once the optimal path has been determined, then the quantiser step size is known for each chunk: these values are passed to the final encoding step 109 in which the encoding software encodes the chunks and enters the coded data into the buffer 6.

We will now give some further details of implementation, and discuss a number of alternatives.

A. Division into Chunks

As regards the division of the video sequence into chunks, there are two considerations here: independence and user perception of quality variation. It has already been mentioned that the application of the Viterbi algorithm requires that the cost measure of each chunk should be independent, that is to say, independent of the quantiser step size chosen for other chunks. In the case of a frame that is coded without reference to other frames (an "I-frame"), this is always the case, and a chunk may consist of a single I-frame. Where inter-frame predictive coding is used, the quality and number of bits of a P-frame depend a good deal upon the coding of previous I or P frame that is used as a predictor. However, we find that if the chunk is of sufficient length, then such effects have a relatively small effect on the perceived quality of the chunk as a whole, and can be tolerated. Conversely, variations of quality over the duration of a chunk are not perceptually significant provided the chunk is not too long. These considerations lead to the following guidelines for the division into chunks:

Chunks may (subject to a limit on length say typically 1 second, maximum 5 seconds):
  in the case of a video signal consisting solely of I-frames, be one frame or any number of frames.
  in the case of a video signal consisting solely of I-frames with P-frames in between, be either
    (a) any sequence that starts with an I-frame; or
    (b) any sequence at all provided that it is long enough that its dependence on the preceding frame is not a significant factor in the quality of the chunk considered as a whole: typically five frames or more.
  in the case of a video signal consisting of I-frames with P-frames and B-frames, the same rule applies, but note that the frames should be considered in coding (not capture-and-display) order when dividing into chunks.

In some cases there may be benefit in endeavouring to align chunk boundaries with scene changes.

Usually one will prefer that all chunks have the same length, though this is not strictly essential. If different lengths are used, the cost should be weighted in proportion to the chunk length.

B. The Encoder

As well as the H.264 coding mentioned, any compression system that allows a trade-off of quality against bit rate can be used, for example ITU-T recommendation H.263 and IS 13818-2. It is not in fact essential that the trade-off be occasioned by changes in quantiser step size; for example, one could instead (or in addition) vary the spatial resolution encoded by use of filtering and sub-sampling operations, and in the case of transform-based systems, one could selectively discard transform coefficients.

C. Quantiser Step Sizes

In the prototype, a set of 17 quantiser step sizes, corresponding to integer values of quantisation parameter from 20 to 36, was examined in Step 103. This gave good results but is very demanding on processing power, and fewer values may be preferred. One attractive option is to obtain results for a small number, maybe 2 or 3, of quantisation parameters and then estimate, the number of bits b(i) and the quality iMOS(i) by interpolation.

For estimating the number of bits it is expected that non-linear interpolation would be preferable. In H.264, quantisation step sizes are spread exponentially-uniformly, so that a change of six in quantisation parameter corresponds to a doubling or halving of the step size. For very small step sizes this would correspond to a halving or doubling of the bit rate. But the dead zone in the quantisation process means in practice this does not happen. On a test of a five second clip, we found on average the bit rate doubled (halved) for a change of five in quantisation parameter, with the ratio for a single step change being typically in the range 1.1 to 1.2. (Note $2^{1/5} \approx 1.15$. Hence from a small number of encoding runs, one could match a curve $y=A \cdot n^x$ to the data points (x=quantisation parameter, y=bit count) for each chunk.)

For estimating the quality iMOS(i) we have found that linear interpolation can be used, as in tests we have found that for a given chunk of video, the quality iMOS(i) varies approximately linearly with the quantisation step size:

$$\text{iMOS}(i) = C - D \cdot \text{ScaledStepSize}(i)$$

where, for *H*.264, $$\text{ScaledStepSize}(i) = 2^{QuantisationParameter(i)/6}$$

and $$D \approx 0.02865$$

C is a constant that depends on the texture of the chunk of video.

D. Perceptual Quality Evaluation

The method described does not presuppose any particular quality metric; indeed it is not essential that a perceptual quality metric is used; indeed, signal-to-noise ratio, or even the quantiser step size itself could be used. However a perceptual quality metric—i.e. one in which the subjective effect of masking effects upon the human viewer is taken into account—is preferred. One particularly attractive method is that described in our co-pending international patent application no. PCT/GB2006/004155 (publication no. WO2007/066066).

E. Target Bit Rate and Target Quality

Reverting to Step 107 of the flowchart of FIG. 2, there are two alternative implementations for this.

Firstly we will consider the case where the user has specified the target bit rate b, and the target quality ($\text{iMOS}_T$) needs to be determined. FIGS. 8 and 9 are graphs showing the effect of varying the target iMOS for some combinations of target bit rate and buffer size. These are shown for the purpose of explanation: it is not necessary to generate the data shown, in order to perform the coding. They were generated by trial runs of the Viterbi algorithm for a range of target iMOS values. FIG. 8 plots the total cost against target iMOS value. The first curve is for a target bit rate that was calculated by choosing for each chunk (using the iMOS and bit count data already generated) the quantiser step size that gave a quality closest to 4.0, adding the corresponding bit counts and taking the average bit rate. The buffer size was set to 0.1 times the buffer size that that would be necessary to avoid buffer overflow were the sequence to be coded and transmitted using those step sizes. The other curves were produced in a similar fashion with bit rates equal to those for constant iMOS equal to 3.7, 3.85 and 4.15 respectively and buffer sizes 0.25, 0.1 and 0.25. FIG. 9 plots, for the same tests, the standard deviation of the actual iMOS.

One method of determining the target iMOS to be used is an iterative method as follows and illustrated in FIG. 10. In this example the iteration has as its target to reduce the standard deviation (i.e. the square root of the sum of the squares of the deviation from the actual average iMOS obtained in the test) but it would be possible instead to use another measure of quality variation such as the variance, or the total cost referred to above (i.e. the sum of the squares of the deviation from the target iMOS used in the test). Firstly the Viterbi algorithm is performed for a lower bound of target iMOS $x_0=0.0$, giving a standard deviation $s_0$ of the actual iMOS over the sequence, and the algorithm repeated for an upper bound $s_1=5.0$, finding the corresponding standard deviation $s_1$;

1. Set a lower bound target quality ($x_0$);
2. Set an upper bound target quality ($x_1$);
3. Perform the Viterbi algorithm, with the specified target bit rate b, to determine the standard deviation ($s_0$ and $s_1$) of quality at these two values of target quality.

Then, the range is divided:
4. Set a lower intermediate target quality ($x_2$) between the lower bound target quality ($x_0$) and the upper bound target quality ($x_1$). Preferably this division is in the Golden ratio so that $x_1-x_2=\phi(x_2-x_0)$ where $\phi$ is the Golden Ratio $(1+\sqrt{d})/2$;
5. Determine the standard deviation ($s_2$) of quality at this point, using the Viterbi algorithm.
6. Set an upper intermediate target quality ($x_3$) between the lower intermediate target quality ($x_2$) and the upper bound target quality ($x_1$). Preferably this division is in the Golden ratio so that $x_1-x_3=\phi(x_3-x_2)$;
7. Determine the standard deviation ($s_3$) of quality at this point;

Depending on whether the standard deviation at the new point ($x_3$, $s_3$) is lower or higher than at the previous ($x_2$, $s_2$) one, either the current lower bound ($x_0$, $s_0$) or upper bound ($x_1$, $s_1$) is replaced:
8. Case 1—the standard deviation ($s_3$) at the upper intermediate target quality ($x_3$) is lower than the standard deviation ($s_2$) at the lower intermediate target quality ($x_2$): replace the lower bound target quality ($x_0$) with the lower intermediate target quality ($x_2$)—the existing upper intermediate target quality ($x_3$) becomes the new lower intermediate target quality; OR
9. Case 2—the standard deviation ($s_3$) at the upper intermediate target quality ($x_3$) is higher than the standard deviation ($s_2$) at the lower intermediate target quality ($x_2$): replace the upper bound target quality (x1) with the upper intermediate target quality ($x_3$)—the existing lower intermediate target quality ($x_2$) becomes the new upper intermediate target quality;

If the standard deviations $s_2$ and $s_3$ are equal then either option may be chosen.

In the case shown in FIG. 10, it is ($x_0$, $s_0$) that is to be replaced; this is removed from consideration so that ($x_2$, $s_2$) becomes the new lower bound.

A new point ($x_4$, $s_4$) is then calculated:
10. Case 1: a new upper intermediate target quality is selected, being between the lower intermediate target quality and the upper bound; OR 11. Case 2: a new lower intermediate target quality is selected, being between the upper intermediate target quality and the lower bound;
12. Repeat steps 8 and 9;
13. Optionally, repeat steps 11, 12 and 13 $\zeta$ times, where $\zeta$ is an integer$\geq 0$.
14. The wanted result is then the remaining intermediate target quality.

On each iteration the difference between higher and lower bounds is scaled by the Golden Ratio. In tests, we used 20 iterations, resulting in a final difference between the bounds of 0.000535.

An alternative method involves a faster search, where we found that two iterations were usually sufficient to get a good result:
1) Define a first quality: in tests, we set the target iMOS to 5.0;
2) Perform the Viterbi algorithm, with the specified target bit rate b, and calculate the standard deviation of iMOS and the average iMOS.
3) If this standard deviation of iMOS exceeds a threshold, set the target iMOS to the average iMOS, and repeat steps 2 and 3 at least once.

If there is uncertainty about how low a standard deviation is acceptable, the termination condition could instead be one based on it not getting significantly smaller than on the previous iteration—and certainly stopping if it should increase i.e. repeating until the standard deviation $\sigma_i$ fails to fall below (by a predetermined margin) its previous value—i.e. until $\sigma_i \geq \sigma_{i-1} - m$. If the new standard deviation is larger than the previous value, it is then necessary to backtrack to the previous value of average quality.

The second situation is where the user has specified the target quality (iMOS$_T$), and the average bit rate b needs to be determined.

Here, tests show that the dependence of standard deviation (or other measure of variation as discussed above) of iMOS upon target bit rate is quite similar to that for target iMOS in FIG. 8. Thus, the approach is very similar to that used previously, where the basic idea is to start with bit rates to the left and right of the minimum, and iteratively get closer to the minimum. The only point raising new issues is choosing initial values of the lower and upper bounds on bit rate so that they lie, respectively, below and above the minimum. In practice any values could be chosen and then verified by noting that if a bit rate less than the target is used, the resulting average iMOS is less than the target iMOS, and if a bit rate more than the target is used, the resulting average iMOS is more than the target iMOS. The process is therefore (note that Steps 4 and 5 are the same, but only Step 5 is in the loop):
1) Choose two bit rates, a lower bound target bit rate and an upper bound target bit rate, likely to be either side of the target bit rate;
2) run the Viterbi algorithm, with the specified target quality (iMOS$_T$) to determine the standard deviation of iMOS and the average iMOS using each of the upper and lower bounds.
3) if the target quality lies outside the range defined by the to averages, repeat steps 1, 2 and 3;
4) Choose a new evaluation point, by setting a lower intermediate target bit rate between the lower bound target bit rate and the upper bound target bit rate. Preferably this division is in the Golden Ratio;
5) run the Viterbi algorithm again to obtain the average and standard deviation of iMOS;
6) Choose a new evaluation point and run the Viterbi algorithm, calculating the standard deviation of iMOS: Set an upper intermediate target bit rate between the lower intermediate target bit rate and the upper bound target bit rate. Preferably this division is in the Golden ratio;
7) measure the average quality and standard deviation of quality obtained at the upper intermediate target bit rate;

Use the principle of the Golden Section search to find to the minimum standard deviation of iMOS by eliminating one of the extreme evaluation points:
8) Case 1—the standard deviation at the upper intermediate target bit rate is lower than the standard deviation at the lower intermediate target bit rate: replace the lower bound target bit rate with the lower intermediate target bit rate—the existing upper intermediate target bit rate becomes the new lower intermediate target bit rate; OR
9) Case 2—the standard deviation at the upper intermediate target bit rate is higher than the standard deviation at the lower intermediate target bit rate: replace the upper bound target bit rate with the upper intermediate target bit rate—the existing lower intermediate target bit rate becomes the new upper intermediate target bit rate;

If they are equal then either option may be chosen.
10) Case 1: a new upper intermediate target bit rate is selected, being between the lower intermediate target bit rate and the upper bound; OR
11) Case 2: a new lower intermediate target bit rate is selected, being between the upper intermediate target bit rate and the lower bound;

If more accuracy is required on the target bit rate, these steps may be repeated:
12) Repeat steps 8 and 9;
13) Optionally repeat steps 10, 11 and 12 $\zeta$ times, where $\zeta$ is an integer$\geq 0$.
14) The result is the remaining intermediate target bit rate.

F. Cost Measure

The cost measure should be function of the of the quality difference, such that the cost generally increases as the difference increases. By generally, we mean small deviations from this rule are unlikely to affect the result, provided that the overall effect is of substantially continuous increase. Usually a monotonically increasing function of the modulus of the quality difference will be suitable, though an asymmetric function that (for example) penalises quality falling below target more heavily than the same deviation in the upward direction, is not excluded. In addition, it is recommended to be a function whose gradient is also monotonically increasing. Functions that we have evaluated include:

$$LinearCost = \sum_{i=1}^{N} |iMOS(i) - iMOS_T| \quad (2)$$

$$SquareCost = \sum_{i=1}^{N} (iMOS(i) - iMOS_T)^2 \quad (3)$$

$$CubicCost = \sum_{i=1}^{N} |iMOS(i) - iMOS_T|^3 \quad (4)$$

$$ExponentialCost1 = \sum_{i=1}^{N} (e^{|iMOS(i) - iMOS_T|} - 1) \quad (5)$$

$$ExponentialCost5 = \sum_{i=1}^{N} (e^{5 \cdot |iMOS(i) - iMOS_T|} - 1) \quad (6)$$

We found that Linear and Exponential 1 do not penalise large deviations from the target iMOS sufficiently, and hence achieve lower performance. The others all perform adequately, but as noted above, we prefer the Square.

As a refinement to penalise quality variations more heavily, an additional cost term might be added as a function of the quality difference between each chunk and its predecessor.

For example, one might add, for chunk j (j=2 ... N), an additional term $\beta \cdot (iMOS(j)-iMOS(j-1))^2$, where ($\beta$ is some weighting factor which is preferably (but not necessarily) less than 1):

$$SquareCost = \sum_{i=1}^{N}(iMOS(i)-iMOS_T)^2 + \beta \cdot \sum_{j=2}^{N}(iMOS(j)-iMOS(j-1))^2$$

G. Trellis State Quantisation

In tests, the buffer level quantisation used in the Viterbi algorithm was varied such that the number of allowable states varied from 30 to 10,000. Results showed that while reasonable results were achieved with 30 states, the use of 300 states allowed much more consistent quality to be achieved. Although the use of even more states achieved even more consistency (lower standard deviation of the iMOS), the gains were small for the increase in computational complexity required.

H. Viterbi Decoding with Chunk Interdependence or Inaccurate iMOS or b(i)

In the method as implemented the cost (iMOS) for each chunk is obtained by coding the whole sequence using a given quantiser step size. Thus, in cases where there is some residual interdependence, the result obtained is slightly inaccurate whenever a chunk is coded with a different step size from its predecessors. Errors can also arise where interpolation is used as discussed in section C above. Inaccuracy of the quality metric will merely mean that the result is slightly further from the optimum than would otherwise have been attained, and is (in moderation) unobjectionable. Incorrect values for the bit count can however be more serious since it can occasionally mean that a trellis path that in reality leads to buffer underflow or overflow is not pruned out as it should be. A solution to this problem is as follows: during coding, any deviation of the buffer state from that expected could be monitored and used to trigger a rerun of the Viterbi algorithm, from that point onwards. Another alternative is that, rather than running the Viterbi algorithm over the whole sequence, the sequence could be divided into sub-sequences each of which was coded independently, or it could be run over a sliding window (as is common in the decoding of convolutional codes). This assumes that the actual buffer level is applied rather than the one produced by the earlier operation of the algorithm.

I. Effect of not Finishing at Zero

It was stated earlier that the trellis path to be chosen was the surviving path that terminates at zero buffer fullness (or— which amounts to the same thing, if dummy data were to continue to enter the receiver buffer after all the real data had been exhausted, the survivor path that terminates at a buffer fullness equal to its initial fullness). It is of interest to consider the effect of choosing a different path.

The choice of a path terminating at a larger value of fullness is possible. This corresponds to more dummy data being in the decoder buffer when decoding has finished, because the filling of the buffer with real data has finished sooner than necessary. This is because this choice results in a set of quantiser step sizes that produces slightly fewer encoded bits than the chosen bit rate can carry, and is unobjectionable since the main effect is that transmission ends slightly earlier than expected. In that it is wasteful of transmission capacity it is not especially attractive to do unless it results in a solution with significantly lower variation in quality than other solutions, or there is no survivor path terminating at zero fullness.

The choice of a path terminating at a smaller value of fullness is also possible. This corresponds to less dummy data being in the decoder buffer when decoding has finished, because the filling of the buffer with real data has finished later. In the extreme case, there would be no dummy data at all, and the buffer would finish empty: the total number of bits used to encode the video, B, is given by:

$$B = \sum_{j=1}^{N} b_j = bt_0 + Nbt_c.$$

Note the average encoded bit rate is no longer b, while the transmission bit rate remains equal to b.

What is claimed is:

1. A method of video coding comprising
   a) dividing a sequence to be encoded into a plurality of temporal portions;
   b) analyzing the sequence to determine for each portion, in accordance with a plurality of encoding quality settings, data establishing the relationship between the quality settings and (i) a quality metric for the portion and (ii) the number of bits generated by encoding the portion at that quality setting;
   c) analyzing the data along with a target quality and target bit rate to choose a set of quality settings, one per portion, that tends to minimize a combined quality cost for the sequence within the constraint that transmission of encoded video at the target bit rate via transmitting and receiving buffers of specified size and initial receiver buffer fullness shall not cause underflow nor overflow; wherein the combined quality cost is the sum of individual quality costs each of which is a function of the amount of deviation of the quality metric of the respective encoded portion from the target quality, the function being such that the cost generally increases as the absolute value of the deviation increases; and
   d) encoding the sequence using the chosen quality settings; wherein:
   the target bit rate is specified and the method further includes the step of determining the target quality that corresponds to this bit rate;
   the target quality is determined by iteratively performing a plurality of trial analyses in accordance with step (c) with the specified target bit rate and a plurality of target quality values chosen to progressively reduce a measure of variation of actual quality during the iteration; and
   the target quality is determined by
      (i) defining a first target quality;
      (ii) measuring the average quality and standard deviation of quality obtained using this target; and
      (iii) if the standard deviation exceeds a threshold, setting the target quality to the average quality obtained and repeating steps (i) and (ii) at least once.

2. A method according to claim 1, in which each portion begins with a frame that is to be encoded without reference to any other frame.

3. A method according to claim 1 in which each portion is at least five frames in duration.

4. A method according to claim 1, in which each portion has a duration not exceeding five seconds.

5. A method according to claim 1, in which each portion has a duration not exceeding one second.

6. A method according to claim 1, in which the analysis (c) is performed using a Viterbi algorithm.

7. A method according to claim 1, in which the step of analysing the sequence comprises a trial encoding of each portion at a plurality of different quality settings.

8. A method according to claim 1, in which the target quality is determined by
   (A) defining upper and lower bounds ($x_0$, $x_1$) of a target quality range;
   (B) measuring the standard deviation ($s_0$, $s_1$) of quality from the target quality at the upper bound and the lower bound;
   (C) selecting an intermediate target quality point ($x_2$) between the upper and lower bounds;
   (D) selecting another, different, intermediate target quality point ($x_3$) between the upper and lower bounds;
   (E) measuring the standard deviation ($s_2$, $s_3$) of quality at the two intermediate target quality points;
   (F) according to whether the standard deviation at the higher of the two intermediate target quality points is lower or higher than that at the lower of the two intermediate target quality points, respectively either
      (i) replacing the lower bound with the lower intermediate target quality, selecting a further intermediate target quality and measuring the standard deviation of quality at this further intermediate target quality or
      (ii) replacing the upper bound with the higher intermediate target quality, selecting a further intermediate target quality and measuring the standard deviation of quality at this further intermediate target quality; and
   (G) repeating step (F) at least once.

9. A method according to claim 1, in which the target quality is specified and including the step of determining the target bit rate that corresponds to this quality.

10. A method according to claim 9 in which the target bit rate is determined by iteratively performing a plurality of trial analyses in accordance with step (c) with the specified target quality and a plurality of target bit rates chosen to progressively reduce a measure of variation of actual quality during the iteration.

11. A method according to claim 10 in which the target bit rate is determined by
   (A) defining upper and lower bounds of a target bit rate range;
   (B) measuring the average quality and standard deviation of quality obtained using each of the upper and lower bounds;
   (C) if the target quality lies outside the range defined by the two averages, repeating steps (A), (B) and (C);
   (D) selecting an intermediate target bit rate between the upper and lower bounds;
   (E) selecting another, different, intermediate target bit rate between the upper and lower bounds;
   (F) measuring the standard deviation of quality at the two intermediate target bit rates;
   (G) according to whether the standard deviation at the higher of the two intermediate target bit rates is lower or higher than that at the lower of the two intermediate target bit rates, respectively either
      (i) replacing the lower bound with the lower intermediate target bit rate, selecting a further intermediate target bit rate and measuring the standard deviation of quality at this further intermediate target bit rate or
      (ii) replacing the upper bound with the higher intermediate target bit rate, selecting a further intermediate target bit rate and measuring the standard deviation of quality at this further intermediate target bit rate; and
   (H) repeating step (G) at least once.

12. A method according to claim 1, in which the cost measure is a function of the deviation of the quality metric of the respective encoded portion from the target quality, the function being one whose gradient increases with increasing deviation.

13. A method according to claim 12 in which the function is the square of the deviation.

14. A method according to claim 1, in which the combined quality cost includes a contribution which is a function of the deviation of the quality metric of a portion and that of the portion that precedes it.

15. A method according to claim 1, including, in step (c), making a prediction of buffer fullness, and, in step (d) monitoring buffer fullness and in the event that it should differ to a predetermined degree from that predicted, to repeat the analysis of step (c) in respect of future portions.

16. A computer system comprising:
   a computer processor, wherein the computer system is configured to:
      a) divide a sequence to be encoded into a plurality of temporal portions;
      b) analyze the sequence to determine for each portion, in accordance with a plurality of encoding quality settings, data establishing the relationship between the quality settings and (i) a quality metric for the portion and (ii) the number of bits generated by encoding the portion at that quality setting;
      c) analyze the data along with a target quality and target bit rate to choose a set of quality settings, one per portion, that tends to minimize a combined quality cost for the sequence within the constraint that transmission of encoded video at the target bit rate via transmitting and receiving buffers of specified size and initial receiver buffer fullness shall not cause underflow nor overflow; wherein the combined quality cost is the sum of individual quality costs each of which is a function of the amount of deviation of the quality metric of the respective encoded portion from the target quality, the function being such that the cost generally increases as the absolute value of the deviation increases; and
      d) encode the sequence using the chosen quality settings; wherein:
      the target bit rate is specified and the computer system is further configured to determine the target quality that corresponds to this bit rate;
      the target quality is determined via the computer system being further configured to iteratively perform a plurality of trial analyses in accordance with the analysis in (c) with the specified target bit rate and a plurality of target quality values chosen to progressively reduce a measure of variation of actual quality during the iteration; and
      the target quality is determined via the computer system being further configured to:
         (i) define a first target quality;
         (ii) measure the average quality and standard deviation of quality obtained using this target; and
         (iii) if the standard deviation exceeds a threshold, set the target quality to the average quality obtained and repeating the defining in (i) and measuring in (ii) at least once.

* * * * *